(12) United States Patent
Hardee et al.

(10) Patent No.: US 12,472,441 B2
(45) Date of Patent: Nov. 18, 2025

(54) MODIFYING USER INTERFACE OF APPLICATION DURING RECORDING SESSION

(71) Applicant: International Business Machines Corporation, Armonk, NY (US)

(72) Inventors: Christopher J. Hardee, Raleigh, NC (US); Pamela A. Nesbitt, Ridgefield, CT (US); Steven Joroff, River Vale, NJ (US); Scott E. Schneider, Rolesville, NC (US)

(73) Assignee: International Business Machines Corporation, Armonk, NY (US)

( * ) Notice: Subject to any disclaimer, the term of this patent is extended or adjusted under 35 U.S.C. 154(b) by 517 days.

(21) Appl. No.: 17/101,181

(22) Filed: Nov. 23, 2020

(65) Prior Publication Data

US 2022/0161145 A1    May 26, 2022

(51) Int. Cl.
  *A63F 13/86* (2014.01)
  *G06F 3/0482* (2013.01)
  (Continued)

(52) U.S. Cl.
  CPC .......... *A63F 13/86* (2014.09); *G06F 3/0482* (2013.01); *G06F 3/04845* (2013.01);
  (Continued)

(58) Field of Classification Search
  None
  See application file for complete search history.

(56) References Cited

U.S. PATENT DOCUMENTS

| 7,458,894 B2 | 12/2008 | Danieli et al. |
| 7,895,522 B2 | 2/2011 | Wong et al. |

(Continued)

FOREIGN PATENT DOCUMENTS

| CN | 110280018 A | 9/2019 |
| CN | 110314375 A | 10/2019 |

(Continued)

OTHER PUBLICATIONS

Japan Patent Office, "Notice of Reasons for Refusal", Jul. 16, 2025, 06 Pages, JP Application No. 2023-530246.

(Continued)

*Primary Examiner* — Matthew Ell
*Assistant Examiner* — David V Luu
(74) *Attorney, Agent, or Firm* — Shackelford, McKinley & Norton, LLP; Robert A. Voigt, Jr.

(57) ABSTRACT

A computer-implemented method, system and computer program product for recording information in a user interface of an application more desired to be seen and heard by viewers. A user interface of an application (e.g., gaming application) is displayed. Upon detecting an initiation of recording the user interface of the application, the user interface of the application is modified to ensure that the information desired to be viewed and heard by the viewers is recorded, such as by adjusting a size of a user interface element, adjusting an audio element of the user interface, etc. After such modifications, the modified user interface of the application is recorded and broadcasted to viewers via a video live streaming service. In this manner, viewers are able to see and hear information desired to be viewed and heard that may have been previously lost during the recording of the user interface prior to such modifications.

25 Claims, 7 Drawing Sheets

(51) Int. Cl.
   *G06F 3/04845*   (2022.01)
   *G06F 3/14*      (2006.01)
   *G06F 3/16*      (2006.01)
   *G06F 9/451*     (2018.01)
   *G06N 20/00*     (2019.01)

(52) U.S. Cl.
   CPC ............ *G06F 3/1454* (2013.01); *G06F 3/165* (2013.01); *G06F 9/451* (2018.02); *G06N 20/00* (2019.01); *A63F 2300/577* (2013.01)

(56) References Cited

U.S. PATENT DOCUMENTS

| | | |
|---|---|---|
| 9,454,993 B1 | 9/2016 | Lawson et al. |
| 10,999,648 B2 | 5/2021 | Kawakami et al. |
| 11,122,303 B2 | 9/2021 | Kawakami et al. |
| 2006/0058103 A1 | 3/2006 | Danieli et al. |
| 2010/0079585 A1 | 4/2010 | Nemeth et al. |
| 2012/0270652 A1 | 10/2012 | Kim et al. |
| 2012/0317504 A1 | 12/2012 | Patel et al. |
| 2013/0117800 A1* | 5/2013 | Hwang ................ H04N 21/435 725/132 |
| 2015/0201199 A1 | 7/2015 | Gu et al. |
| 2017/0014159 A1 | 1/2017 | Stokes et al. |
| 2017/0168654 A1 | 6/2017 | Friend et al. |
| 2018/0192160 A1* | 7/2018 | Ravindran ....... H04N 21/23418 |
| 2019/0099678 A1 | 4/2019 | Khan et al. |
| 2019/0261025 A1* | 8/2019 | Hussain ............. H04N 21/2393 |
| 2019/0306566 A1* | 10/2019 | Zaatarah .......... H04N 21/47815 |
| 2020/0050527 A1* | 2/2020 | Jones ...................... G06F 17/18 |
| 2020/0382821 A1 | 12/2020 | Kawakami et al. |
| 2021/0168416 A1* | 6/2021 | Weiner ............. H04N 21/26258 |
| 2021/0208842 A1* | 7/2021 | Cassidy .................. G10L 25/48 |
| 2021/0306680 A1* | 9/2021 | Yuan ..................... A63F 13/213 |

FOREIGN PATENT DOCUMENTS

| | | |
|---|---|---|
| CN | 110417991 A | 11/2019 |
| CN | 116472714 A | 7/2023 |
| DE | 112021006096 T5 | 10/2023 |
| EP | 1612677 A2 | 1/2006 |
| GB | 2616756 A | 9/2023 |
| JP | 2003-330715 A | 11/2003 |
| JP | 2006-081895 A | 3/2006 |
| JP | 2009-532956 A | 9/2009 |
| JP | 2010-088111 A | 4/2010 |
| JP | 2018-022503 A | 2/2018 |
| JP | 2019-047366 A | 3/2019 |
| JP | 2019-096187 A | 6/2019 |
| JP | 2023-550747 A | 12/2023 |
| WO | 02077935 A2 | 10/2002 |
| WO | 2015/042048 A2 | 3/2015 |
| WO | 2017058951 A1 | 4/2017 |
| WO | 2019/067640 A1 | 4/2019 |
| WO | 2020/028390 A1 | 2/2020 |
| WO | 2022/106936 A1 | 5/2022 |

OTHER PUBLICATIONS

Japan Patent Office, "Notice of Reasons for Refusal" Feb. 12, 2025, 10 Pages, JP Application No. 2023-530246.

International Search Report and the Written Opinion of the International Searching Authority for International Application No. PCT/IB2021/059811 dated Feb. 8, 2022, pp. 1-10.

* cited by examiner

MODIFYING USER INTERFACE OF APPLICATION DURING RECORDING SESSION

TECHNICAL FIELD

The present disclosure relates generally to screen recorders, such as gaming recorders, and more particularly to adjusting the user interface of an application, such as a gaming application, in a manner that allows a viewer of the content to see and hear a greater amount of information that viewers desire to see and hear.

BACKGROUND

Video live streaming services, such as Twitch®, provide online streaming media that is simultaneously recorded and broadcasted in real time. For example, such video live streaming services may provide video game live streaming, including broadcasts of esports (electronic sports) competitions. Other types of content that may be simultaneously recorded and broadcasted include music broadcasts, creative content and "in real life" streams.

An individual, referred to as an "online streamer," broadcasts themselves online, including in real time, through such video live streaming services. For example, an individual may broadcast his/her gaming sessions through such video live streaming services.

Typically, the online streamer uses a screen recorder, such as a gaming recorder, to digitally record the computer screen output, such as the user's gaming session. Examples of gaming recorders include Filmora® Scrn, OBS Studio, VLC®, xSplit, Nvidia® ShadowPlay®, Fraps, etc. Such gaming recorders may allow the user to capture system audio, video, microphone and webcam at the same time. Furthermore, such gaming recorders allow the user to add markers at different points, change video speed as well as add fade in/fade out. Such gaming recorders may allow the user to customize the recording settings, such as targeting the entire screen, a specific region or the target window.

However, such recorders may not record all the information desired to be seen and heard by the viewers. For example, viewers may desire to see more textual content pertaining to the avatar than what is being recorded by the recorder due to the fact that the user interface of the application (e.g., gaming application) displays the textual content pertaining to the avatar underneath an icon. In another example, viewers may desire to see the stream chat which is currently displayed in the user interface of the application (e.g., gaming application) in a small font size along the border of the screen thereby making it unreadable for the viewers. In a further example, the user interface element of the application (e.g., gaming application) may depict information pertaining to the gaming opponent (e.g., "There are 26 cards in your opponent's deck") along the side of the screen. The viewers, however, may desire to have this user interface element depicted in the center of the screen. In another example, the audio volume established by the user recording the application (e.g., gaming application) is more quiet than desired by the viewers, and hence the viewers may miss some important advances by the avatar in the game which are indicated via sounds.

As a result, information desired to be viewed and heard by the viewers of video live streaming services may be lost during the recording session.

Unfortunately, there is not currently a means for enabling screen recorders, such as gaming recorders, to record such missing information during the recording session.

SUMMARY

In one embodiment of the present disclosure, a computer-implemented method for recording information in a user interface of an application more desired to be seen and heard by viewers comprises displaying the user interface of the application. The method further comprises detecting an initiation of recording the user interface of the application. The method additionally comprises modifying the user interface of the application in response to detecting the initiation of recording the user interface of the application, where the modification of the user interface of the application comprises one or more of the following: displaying new content, adjusting a size of an element of the user interface, adjusting a location of an element of the user interface, adjusting a duration of time of displaying an element of the user interface and adjusting an audio element of the user interface.

In another embodiment of the present disclosure, a computer program product for recording information in a user interface of an application more desired to be seen and heard by viewers, the computer program product comprising one or more computer readable storage mediums having program code embodied therewith, the program code comprising programming instructions for displaying the user interface of the application. The program code further comprises the programming instructions for detecting an initiation of recording the user interface of the application. The program code additionally comprises the programming instructions for modifying the user interface of the application in response to detecting the initiation of recording the user interface of the application, where the modification of the user interface of the application comprises one or more of the following: displaying new content, adjusting a size of an element of the user interface, adjusting a location of an element of the user interface, adjusting a duration of time of displaying an element of the user interface and adjusting an audio element of the user interface.

In a further embodiment of the present disclosure, a system comprises a memory for storing a computer program for recording information in a user interface of an application more desired to be seen and heard by viewers and a processor connected to the memory, where the processor is configured to execute the program instructions of the computer program comprising displaying the user interface of the application. The program instructions of the computer program further comprise detecting an initiation of recording the user interface of the application. The program instructions of the computer program additionally comprise modifying the user interface of the application in response to detecting the initiation of recording the user interface of the application, where the modification of the user interface of the application comprises one or more of the following: displaying new content, adjusting a size of an element of the user interface, adjusting a location of an element of the user interface, adjusting a duration of time of displaying an element of the user interface and adjusting an audio element of the user interface.

In this manner, the present disclosure enables viewers of live screening (e.g., viewing a gaming application that is recorded and broadcasted simultaneously over a network) to view and hear information that the viewers desire to see and hear which may not have been previously visible and audible without modifications to the user interface of the application.

For example, upon detecting an initiation of recording the user interface of the application, the user interface of the application (e.g., gaming application) is modified to ensure that the information desired to be viewed (and heard) by the viewers is recorded, such as by displaying new content, adjusting a size of an element of the user interface, adjusting a location of an element of the user interface, adjusting a duration of time in displaying an element of the user interface, adjusting an audio element of the user interface, adding overlay information to the user interface, adding or removing an audio component, adding, removing or altering transitions (moving elements of the user interface), etc. Such modifications to ensure that the information desired to be viewed (and heard) by the viewers is recorded may be determined using machine learning. After such modifications, the modified user interface of the application is recorded and broadcasted to viewers via a video live streaming service. In this manner, the viewers are able to see and hear information desired to be viewed and heard that may have been previously lost during the recording of the user interface prior to such modifications.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present disclosure can be obtained when the following detailed description is considered in conjunction with the following drawings, in which.

DETAILED DESCRIPTION

In some embodiments of the present disclosure, the present disclosure comprises a computer-implemented method, system and computer program product for recording information in a user interface of an application more desired to be seen and heard by viewers. In one embodiment of the present disclosure, the user interface for the application (e.g., gaming application) is displayed. Upon detecting an initiation of recording the user interface of the application, the user interface of the application is modified to ensure that the information desired to be viewed and heard by the viewers is recorded, such as by displaying new content, adjusting a size of an element of the user interface, adjusting a location of an element of the user interface, adjusting a duration of time in displaying an element of the user interface, adjusting an audio element of the user interface, adding overlay information to the user interface, adding or removing an audio component, adding, removing or altering transitions (moving elements of the user interface), etc. After such modifications, the modified user interface of the application is recorded and broadcasted to viewers via a video live streaming service. In this manner, the viewers are able to see and hear information desired to be viewed and heard that may have been previously lost during the recording of the user interface prior to such modifications.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Figure 1:
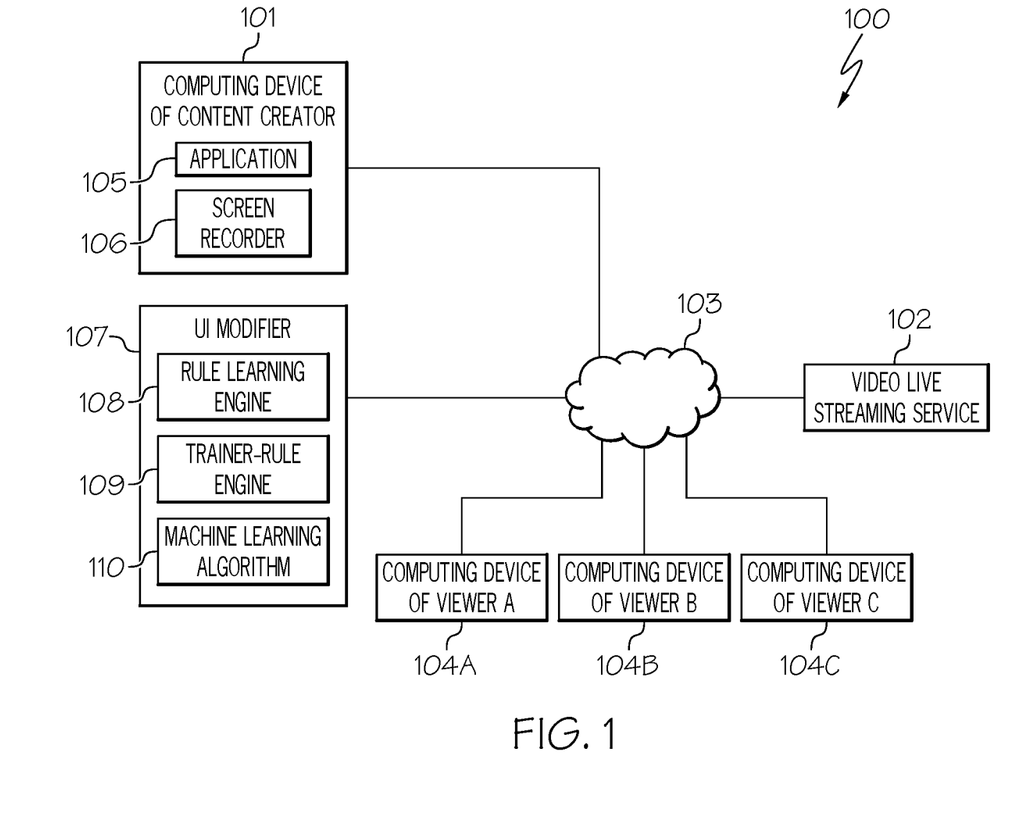
FIG. 1 illustrates a communication system for practicing the principles of the present disclosure in accordance with an embodiment of the present disclosure.

Referring now to the Figures in detail, FIG. 1 illustrates a communication system 100 for practicing the principles of the present disclosure in accordance with an embodiment of the present disclosure. Communication system 100 includes a computing device 101 for the content creator (identified as "Computing Device of Content Creator") connected to a video live streaming service 102 via a network 103. A "content creator," as used herein, refers to the user who records content to be streamed to other users (referred to as "viewers") via video live streaming service 102. It is noted that both computing device 101 and the user ("content creator") of computing device 101 may be identified with element number 101.

Video live streaming service (e.g., Twitch®) 102 is configured to provide online streaming media that is simultaneously recorded and broadcasted in real time. For example, video live streaming service 102 provides video game live streaming, including broadcasts of esports (electronic sports) competitions. Other types of content that may be simultaneously recorded and broadcasted include music broadcasts, creative content and "in real life" streams.

Such content may be broadcasted by video live streaming service 102 to viewers, such as computing devices 104A-104C (identified as "Computing Device of Viewer A," "Computing Device of Viewer B," and "Computing Device of Viewer C," respectively, in FIG. 1) connected to video live streaming service 102 via network 103. Computing devices 104A-104C may collectively or individually be referred to as computing devices 104 or computing device 104, respectively. A "viewer," as used herein, refers to the user who views and hears the content that was broadcasted by content creator 101. It is noted that both computing device 104 and the user ("viewer") of computing device 104 may be identified with element number 104.

Computing devices 101, 104 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with other computing devices 101, 104 and video live streaming service 102.

A description of the hardware configuration of computing devices 101, 104 is provided further below in connection with FIG. 2.

Referring again to FIG. 1, network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

As discussed above, content creator 101 may create content to be streamed over network 103 to be viewed by viewers 104. Such content may include gaming content from an application 105 (e.g., gaming application) of computing device 101 as shown in FIG. 1. Such an application may display a user interface to content creator 101 to interact with application 105, such as to play the game of the application in the example of application 105 being a gaming application. In the example of application 105 being a gaming application, the movements of content creator 101 while playing the game of gaming application 105 may be recorded to be broadcasted to viewers 104 via video live streaming service 102 by utilizing a screen recorder 106 of computing device 101, such as a gaming recorder.

Examples of gaming recorders include Filmora® Scrn, OBS Studio, VLC®, xSplit, Nvidia® ShadowPlay®, Fraps, etc. Such gaming recorders may allow the user to capture system audio, video, microphone and webcam at the same time. Furthermore, such gaming recorders allow the user to add markers at different points, change video speed as well as add fade in/fade out. Such gaming recorders may allow the user to customize the recording settings, such as targeting the entire screen, a specific region or the target window.

However, as discussed in the Background section, such recorders may not record all the information desired to be seen and heard by the viewers. For example, viewers may desire to see more textual content pertaining to the avatar than what is being recorded by the recorder due to the fact that the user interface of the application (e.g., gaming application) displays the textual content pertaining to the avatar underneath an icon. In another example, viewers may desire to see the stream chat which is currently displayed in the user interface of the application (e.g., gaming application) in a small font size along the border of the screen thereby making it unreadable for the viewers. In a further example, the user interface element of the application (e.g., gaming application) may depict information pertaining to the gaming opponent (e.g., "There are 26 cards in your opponent's deck") along the side of the screen. The viewers, however, may desire to have this user interface element depicted in the center of the screen. In another example, the audio volume established by the user recording the application (e.g., gaming application) is more quiet than desired by the viewers, and hence the viewers may miss some important advances by the avatar in the game which are indicated via sounds.

As a result, information desired to be viewed and heard by the viewers of video live streaming services may be lost during the recording session.

Unfortunately, there is not currently a means for enabling screen recorders, such as gaming recorders, to record such missing information during the recording session.

In one embodiment, screen recorder 106 is able to record such missing information desired to be viewed and heard by viewers, such as viewers 104, by a user interface (UI) modifier 107 instructing application 105, such as a gaming application, to modify the user interface presented to content creator 101 in a manner that allows the desired information to be viewed and heard by viewers 104 to be clearly shown (and audible) on the user interface of application 105 during the recording of the user interface of application 105 by screen recorder 106 as it is broadcasted to viewers 104 via video live streaming service 102. In this manner, viewers 104 will be able to view and hear the desired information that may have been previously lost during the recording of the user interface of application 105 by screen recorder 106 prior to such modifications to the user interface of application 105.

In one embodiment, UI modifier 107 is connected to the components of communication system 100, such as computing devices 101, 104 and video live streaming service 102, via network 103.

In one embodiment, UI modifier 107 determines the types of modifications to the user interface of application 105 to be made to ensure that viewers 104 view and hear the desired information using machine learning. For example, the user interface of application 105 may be modified by displaying new content, adjusting the size of a user interface element, adjusting a location of a user interface element, adjusting a duration of time that a user interface element is displayed, adjusting an audio element of the user interface (e.g., adjusting audio volume), adding overlay information to the user interface, adding or removing an audio component, adding, removing or altering transitions (moving elements of the user interface), etc. For instance, UI modifier 107 may determine to modify the user interface of application 105 by increasing/decreasing the time a user interface element is displayed, such as for all depicted user interface elements or only for a specific type of user interface elements (e.g., user interface elements with text). It is noted that these are exemplary modifications and that the principles of the present disclosure are not to be limited in scope to such examples. Instead, the principles of the present disclosure are to include any modification to the user interface of application 105 that ensures that the information desired to be viewed and heard by viewers 104 is most clearly seen and audible during the recorded session. A person of ordinary skill in the art would be capable of applying the principles of the present disclosure to such implementations. Further, embodiments applying the principles of the present disclosure to such implementations would fall within the scope of the present disclosure.

In one embodiment, UI modifier 107 uses machine learning to examine the stylistic, visual and audible preferences of viewers 104 viewing a recorded broadcast, such as a recorded gaming session by content creator 101 via video live streaming service 102, by asking them questions via a survey or by requesting feedback. For example, the survey may ask "How difficult is reading characters on the screen? What is your opinion about organization of information on the screen? Is it important to see textual content for the avatars? Is it important to see the stream chat? What are your preferences as to the location of the stream chat? What is your preference as to the size of the font size of the textual content? Is it important to view the information pertaining to the gaming opponent? Is the recorded audio typically too quiet for you? Such an exemplary survey may be provided to viewers 104 by QuestionPro®. The collection of such survey information may be collected and used by an expert to provide an accurate training data to the machine learning algorithm (e.g., supervised learning) to build an accurate mathematical model to appropriately modify the user interface elements of the application (e.g., gaming application) as discussed further below.

In one embodiment, UI modifier 107 using a machine learning algorithm (e.g., supervised learning) to build a mathematical model based on sample data consisting of user interface characteristics that are preferred by viewers 104 of a recorded video session, such as displaying text pertaining to the avatar in a certain font at a certain distance from the avatar or displaying information pertaining to the gaming opponent along the side of the screen. Such user interface characteristics may be obtained and tabulated by experts, who in turn, utilize such information to develop the sample data. Such a data set is referred to herein as the "training data" which is used by the machine learning algorithm to make predictions or decisions without being explicitly programmed to perform the task. Such a training set is provided by an expert in modifying the user interface of the application being recorded in such a manner as to ensure that the information desired to be viewed and heard by viewers 104 is most clearly seen and audible during the recorded session. Examples of such supervised learning algorithms include nearest neighbor, Naive Bayes, decision trees, linear regression, support vector machines and neural networks.

In one embodiment, the machine learning model corresponds to a classification model trained to predict the modifications to the user interface of the application being recorded in such a manner as to ensure that the information desired to be viewed and heard by viewers 104 is most clearly seen and audible during the recorded session based on the training set.

In one embodiment, UI modifier 107 utilizes profiles of viewers 104 to determine what modifications to the user interface of application 105 need to be made during the recording of application 105 as it is broadcasted to viewers 104 via video live streaming service 102. Such profiles may include user preferences concerning size and location of various user interface elements, such as avatars and textual content, transitions (behavior of moving items in the user interface), duration of time visual elements should be displayed, overlay information, content to be displayed, audio volume, etc. Such user preferences extracted from these profiles may be used to adapt the user interface of application 105 as it is broadcasted to viewers 104 via video live streaming service 102. In one embodiment, such preferences may be tabulated to form a summary of preferences across a group of viewers 104 so that the user interface of application 105 is modified accordingly during its recording to ensure that the information desired to be viewed and heard by the majority of viewers 104 is most clearly seen and audible during the recorded session.

In one embodiment, UI modifier 107 observes user interactions (interactions by viewers 104) with the broadcasted recorded sessions to provide implicit feedback as to what viewers 104 like and not like about the broadcasted recorded sessions. In one embodiment, such observations may be made by utilizing heatmapping or session recording tools (e.g., Hotjar®, Mouseflow®, Inspectlet, etc.). Such interactions may be used to infer user preferences concerning size and location of various user interface elements, such as avatars and textual content, transitions (behavior of moving items in the user interface), duration of time visual elements should be displayed, overlay information, content to be displayed, audio volume, etc. Machine learning techniques may utilize such information to recognize patterns from user behavior and make recommendations as far as which modifications to the user interface of application 105 during recording should be made.

In one embodiment, UI modifier 107 utilizes a pre-existing set of user interface adaptation rules that are upgraded according to the viewer's experience with the broadcasted recorded session. In one embodiment, such user experience is utilized by a rule learning engine 108 of UI modifier 107 as discussed further below.

In one embodiment, viewers 104 provide feedback to UI modifier 107 regarding the broadcasted recorded session using emoticons or recommendation frames. With respect to emoticons based feedback, such emoticons are aimed at expressing the satisfaction degrees among viewers 104 picking the emoticon judging his/her experience. With respect to recommendation frames, a simple interaction, such as a pop-up window or sliding area, may be used to provide recommendations. Such feedback may include user preferences concerning size and location of various user interface elements, such as avatars and textual content, transitions (behavior of the moving items in the user interface), duration of time visual elements should be displayed, overlay information, content to be displayed, audio volume, etc.

Rule learning engine 108 is responsible for analyzing collected user judgments. Gathered data are intended to serve in a promoting/demoting ranking, which assigns a priority to the executed rule in order to promote or demote rules and try to resolve conflicting ones. In one embodiment, rule learning engine 108 is based on a supervised learning approach requiring a trainer-rule engine 109 of UI modifier 107.

In one embodiment, trainer-rule engine 109 is responsible for ensuring the training phrase by executing pre-existed adaptation rules, which serve by way of a training set to detect a pattern of user behavior throughout viewers' 104 interactions and feedback. Furthermore, trainer-rule engine 109 generates the statistics and (promote/demote) ranking for rule learning engine 108.

In one embodiment, a machine learning algorithm 110 (e.g., learning classifier algorithm) of UI modifier 107 utilizes such rules as a training set for recommending the modifications to the user interface of application 105 during recording, where such rules are updated based on additional feedback provided by viewers 104 discussed above.

A description of the hardware configuration of UI modifier 107 is provided further below in connection with FIG. 3.

System 100 is not to be limited in scope to any one particular network architecture. System 100 may include any number of computing devices 101, 104, video live streaming services 102 and UI modifiers 107. It is noted that some or all of the features of UI modifier 107 may reside within computing device 101.

Figure 2:
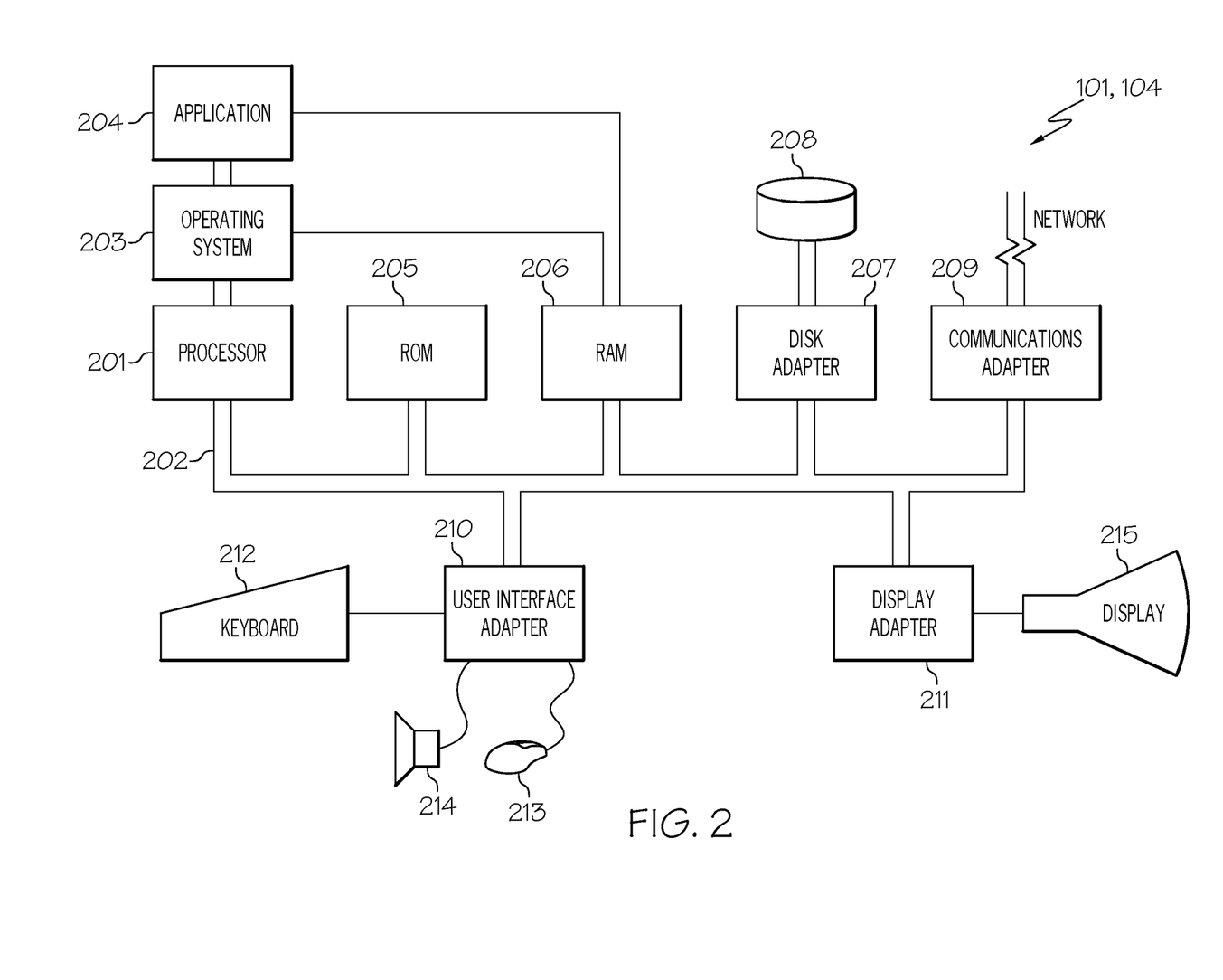
FIG. 2 illustrates an embodiment of the present disclosure of the hardware configuration of a computing device which is representative of a hardware environment for practicing the present disclosure.

Referring now to FIG. 2, FIG. 2 illustrates an embodiment of the present disclosure of the hardware configuration of a computing device 101, 104 which is representative of a hardware environment for practicing the present disclosure.

Computing device 101, 104 has a processor 201 connected to various other components by system bus 202. An operating system 203 runs on processor 201 and provides control and coordinates the functions of the various components of FIG. 2. An application 204 in accordance with the principles of the present disclosure runs in conjunction with operating system 203 and provides calls to operating system 203 where the calls implement the various functions or services to be performed by application 204. Application 204 of computing device 101, may include, for example, application 105 (e.g., gaming application) and screen recorder 106. Application 204 of computing device 101 may further include a program for modifying the user interface of application 105 so as to ensure that information desired to be viewed and heard by viewers 104 is recorded. Application 204 of computing device 104, may include, for example, an application for viewing (and hearing) the broadcasted recorded session of application 105.

Referring again to FIG. 2, read-only memory ("ROM") 205 is connected to system bus 202 and includes a basic input/output system ("BIOS") that controls certain basic functions of computing device 101, 104. Random access memory ("RAM") 206 and disk adapter 207 are also connected to system bus 202. It should be noted that software components including operating system 203 and application 204 may be loaded into RAM 206, which may be computing device's 101, 104 main memory for execution. Disk adapter 207 may be an integrated drive electronics ("IDE") adapter that communicates with a disk unit 208, e.g., disk drive. It is noted that the programs discussed above may reside in disk unit 208 or in application 204.

Computing device 101, 104 further includes a communications adapter 209 connected to bus 202. Communications adapter 209 may interconnect bus 202 with an outside network (e.g., network 103 of FIG. 1) thereby allowing computing device 101, 104 to communicate with other devices, such as live video streaming service 102, UI modifier 107, etc.

I/O devices are also connected to computing device 101, 104 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing device 101, 104 through keyboard 212 or mouse 213 and receiving output from computing device 101, 104 via display 215 or speaker 214. Other input mechanisms may be used to input data to computing device 101, 104 that are not shown in FIG. 2, such as display 215 having touch-screen capability and keyboard 212 being a virtual keyboard. Computing device 101, 104 of FIG. 2 is not to be limited in scope to the elements depicted in FIG. 2 and may include fewer or additional elements than depicted in FIG. 2.

Figure 3:
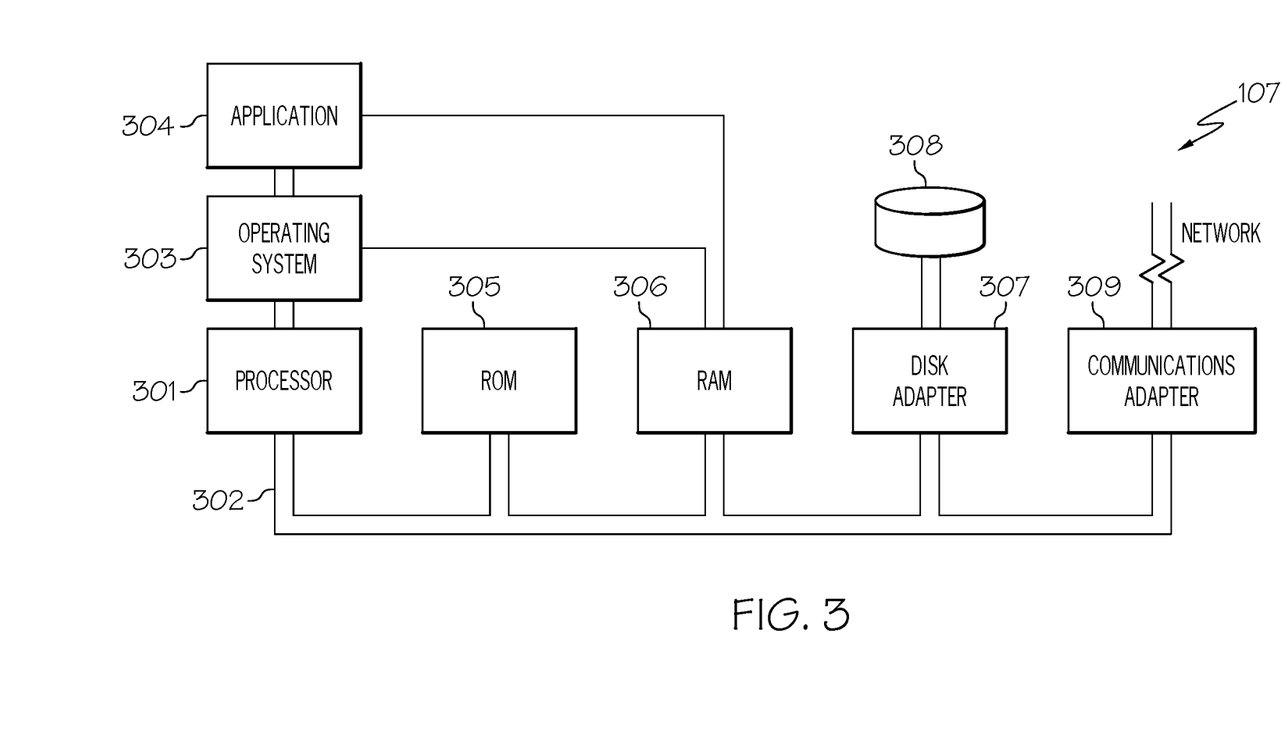
FIG. 3 illustrates an embodiment of the present disclosure of the hardware configuration of the user interface modifier which is representative of a hardware environment for practicing the present disclosure.

Referring now to FIG. 3, FIG. 3 illustrates an embodiment of the present disclosure of the hardware configuration of UI modifier 107 (FIG. 1) which is representative of a hardware environment for practicing the present disclosure.

UI modifier 107 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, rule learning engine 108 (FIG. 1), trainer-rule engine 109 (FIG. 1) and machine learning algorithm 110 (FIG. 1). Furthermore, application 304 is configured to determine what modifications to be made to the user interface of application 105 to ensure that the information desired to be viewed and heard by the majority of viewers 104 is most clearly seen and audible during the recorded session, as discussed further below in connection with FIGS. 4-7.

Referring again to FIG. 3, read-only memory ("ROM") 305 is connected to system bus 302 and includes a basic input/output system ("BIOS") that controls certain basic functions of UI modifier 107. Random access memory ("RAM") 306 and disk adapter 307 are also connected to system bus 302. It should be noted that software components including operating system 303 and application 304 may be loaded into RAM 306, which may be UI modifier's 107 main memory for execution. Disk adapter 307 may be an integrated drive electronics ("IDE") adapter that communicates with a disk unit 308, e.g., disk drive. It is noted that the program for determining what modifications to be made to the user interface of application 105 to ensure that the information desired to be viewed and heard by the majority of viewers 104 is most clearly seen and audible during the recorded session, as discussed further below in connection with FIGS. 4-7, may reside in disk unit 308 or in application 304.

UI modifier 107 may further include a communications adapter 309 connected to bus 302. Communications adapter 309 interconnects bus 302 with an outside network (e.g., network 103 of FIG. 1) to communicate with other devices, such as video live streaming service 102 and computing devices 101, 104.

In one embodiment, application 304 of UI modifier 107 includes the software components of rule learning engine 108, trainer-rule engine 109 and machine learning algorithm 110. In one embodiment, such components may be implemented in hardware, where such hardware components would be connected to bus 302. The functions discussed above performed by such components are not generic computer functions. As a result, UI modifier 107 is a particular machine that is the result of implementing specific, non-generic computer functions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, video live streaming services, such as Twitch®, provide online streaming media that is simultaneously recorded and broadcasted in real time. For example, such video live streaming services may provide video game live streaming, including broadcasts of esports (electronic sports) competitions. Other types of content that may be simultaneously recorded and broadcasted include music broadcasts, creative content and "in real life" streams. An individual, referred to as an "online streamer," broadcasts themselves online, including in real time, through such video live streaming services. For example, an individual may broadcast his/her gaming sessions through such video live streaming services. Typically, the online streamer uses a screen recorder, such as a gaming recorder, to digitally record the computer screen output, such as the user's gaming session. Examples of gaming recorders include Filmora® Scrn, OBS Studio, VLC®, xSplit, Nvidia® ShadowPlay®, Fraps, etc. Such gaming recorders may allow the user to capture system audio, video, microphone and webcam at the same time. Furthermore, such gaming recorders allow the user to add markers at different points, change video speed as well as add fade in/fade out. Such gaming recorders may allow the user to customize the recording settings, such as targeting the entire screen, a specific region or the target window. However, such recorders may not record all the information desired to be seen and heard by the viewers. For example, viewers may desire to see more textual content pertaining to the avatar than what is being recorded by the recorder due to the fact that the user interface of the application (e.g., gaming application) displays the textual content pertaining to the avatar underneath an icon. In another example, viewers may desire to see the stream chat which is currently displayed in the user interface of the application (e.g., gaming application) in a small font size along the border of the screen thereby making it unreadable for the viewers. In a further example, the user interface element of the application (e.g., gaming application) may depict information pertaining to the gaming opponent (e.g., "There are 26 cards in your opponent's deck") along the side of the screen. The viewers, however, may desire to have this user interface element depicted in the center of the screen. In another example, the audio volume established by the user recording the application (e.g., gaming application) is more quiet than desired by the viewers, and hence the viewers may miss some important advances by the avatar in the game which are indicated via sounds. As a result, information desired to be viewed and heard by the viewers of video live streaming services may be lost during the recording session. Unfortunately, there is not currently a means for enabling screen recorders, such as gaming recorders, to record such missing information during the recording session.

Figure 4:
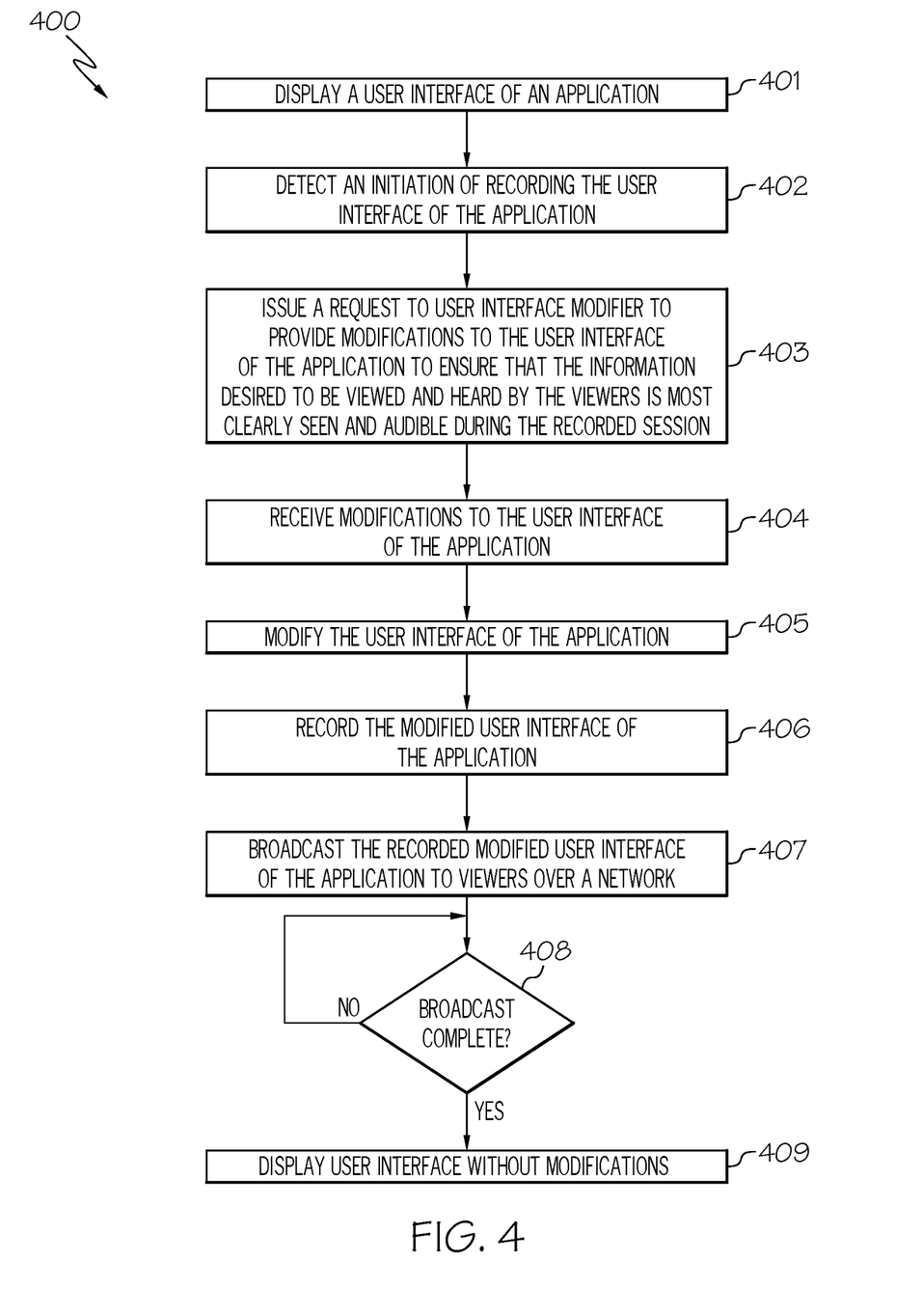
FIG. 4 is a flowchart of a method for modifying the user interface of an application to ensure that the information desired to be viewed and heard by the viewers is recorded in accordance with an embodiment of the present disclosure.
Figure 5:
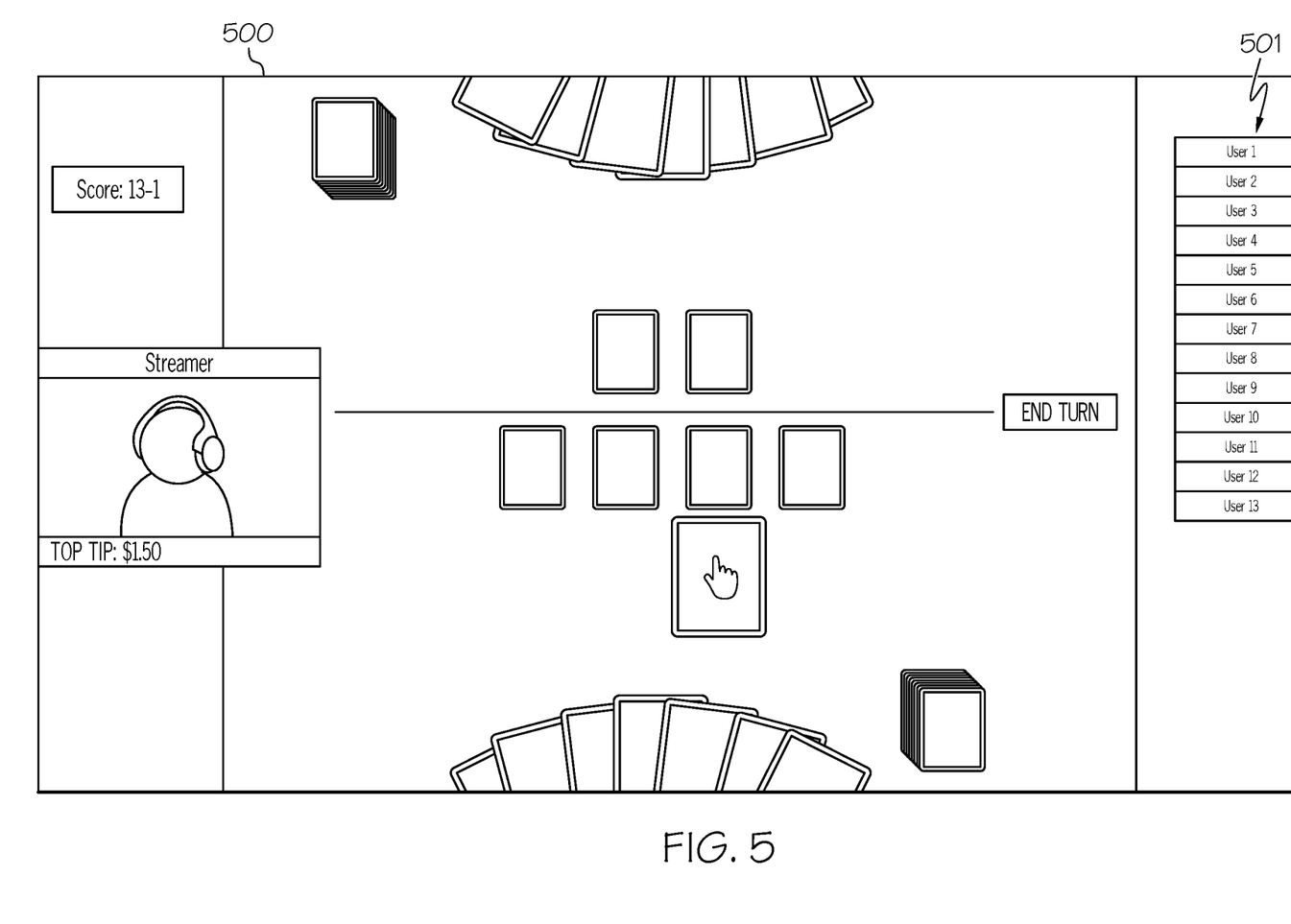
FIG. 5 illustrates a user interface of an application (e.g., gaming application) prior to modifying the user interface elements in accordance with an embodiment of the present disclosure.
Figure 6:
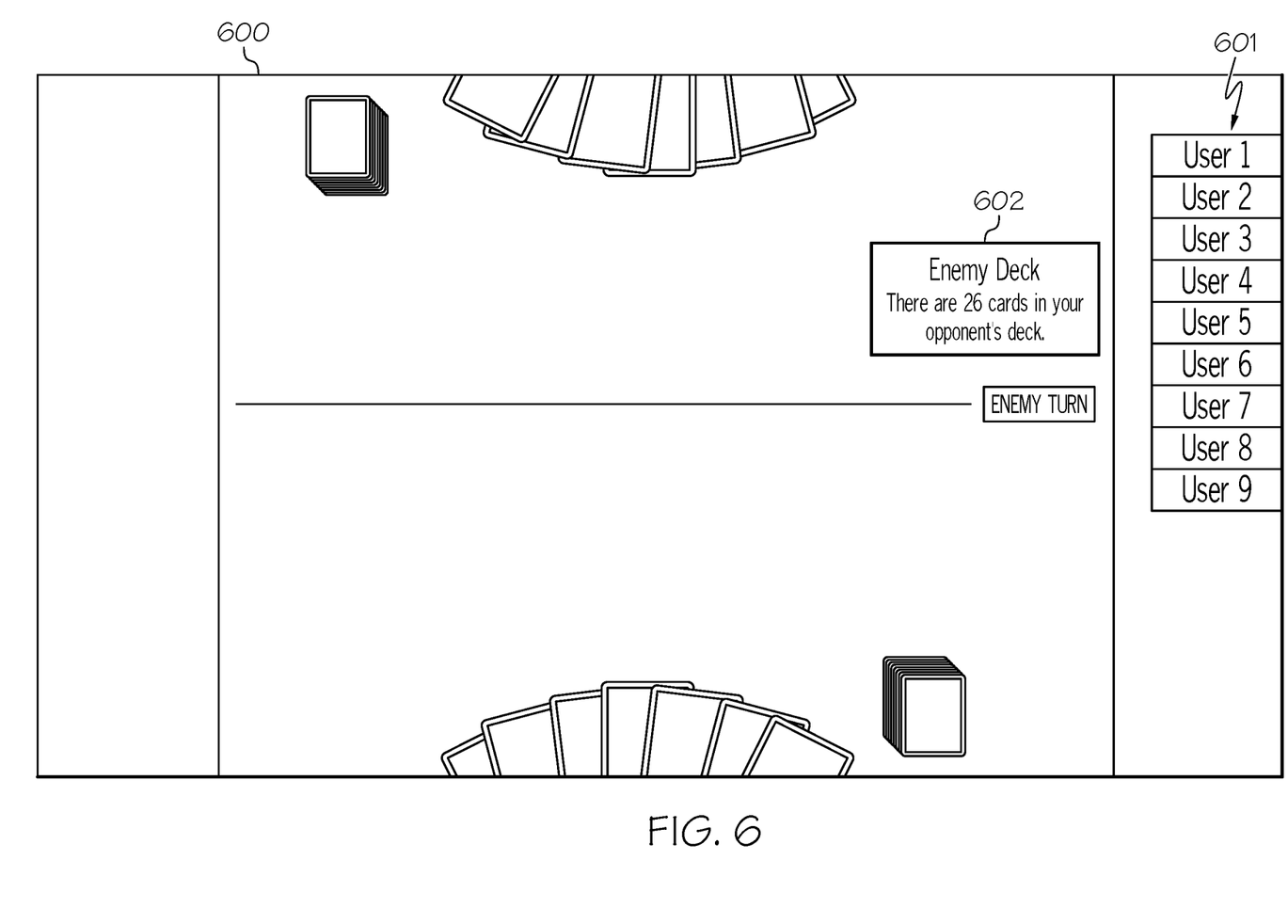
FIG. 6 illustrates an example of the user interface of the application (e.g., gaming application) after modifying its user interface elements in accordance with an embodiment of the present disclosure.
Figure 7:
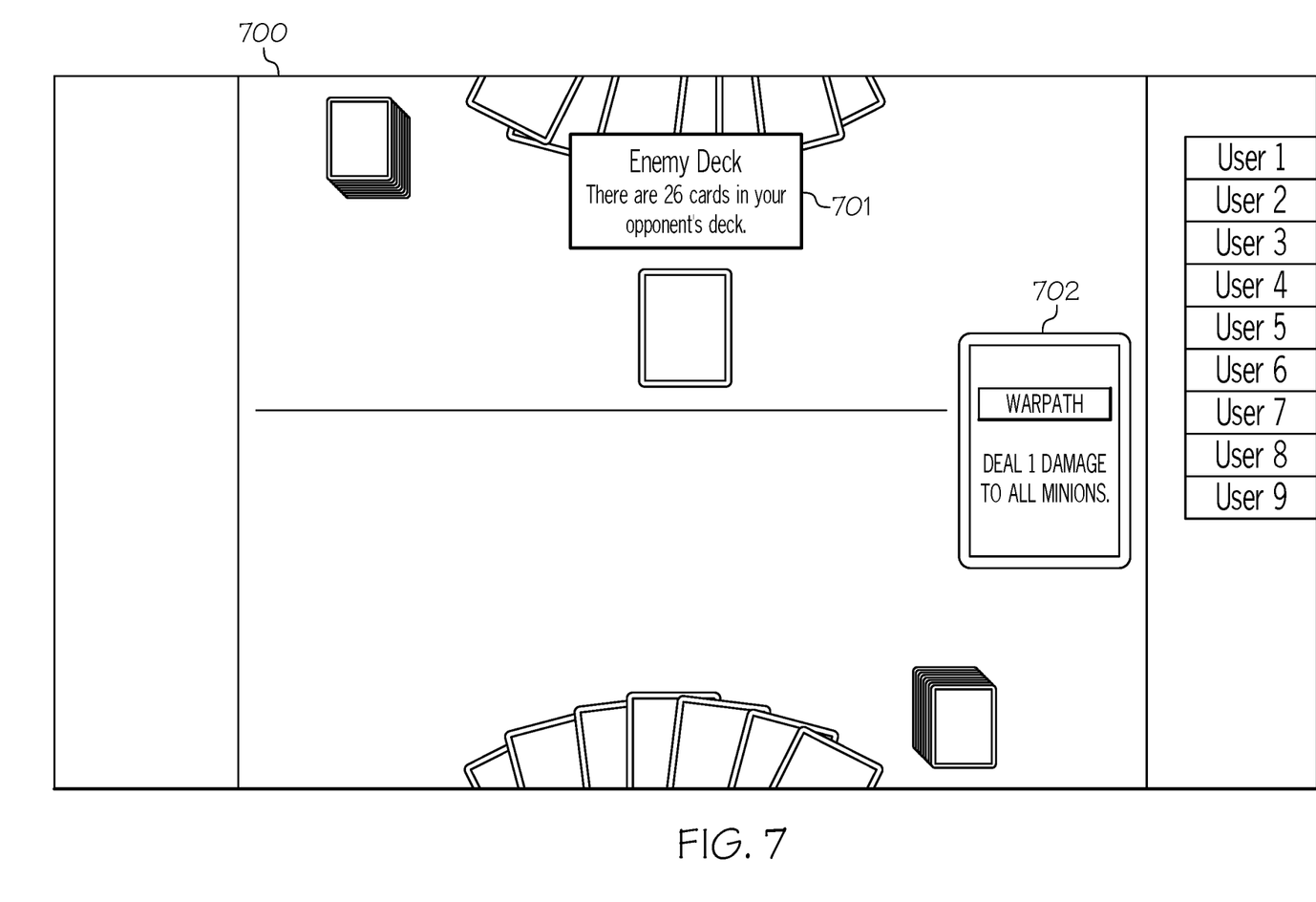
FIG. 7 illustrates a further example of the user interface of the application (e.g., gaming application) after modifying its user interface elements in accordance with an embodiment of the present disclosure.

The embodiments of the present disclosure provide a means for ensuring that the information desired to be viewed and heard by viewers 104 is most clearly seen and audible during the recorded session as discussed below in connection with FIGS. 4-7. FIG. 4 is a flowchart of a method for modifying the user interface of an application to ensure that the information desired to be viewed and heard by viewers 104 is recorded. FIG. 5 illustrates a user interface of an application (e.g., gaming application) prior to modifying the user interface elements. FIG. 6 illustrates an example of the user interface of the application (e.g., gaming application) after modifying its user interface elements. FIG. 7 illustrates a further example of the user interface of the application (e.g., gaming application) after modifying its user interface elements.

As stated above, FIG. 4 is a flowchart of a method 400 for modifying the user interface of application 105 (FIG. 1) to ensure that the information desired to be viewed and heard by viewers 104 (FIG. 1) is recorded in accordance with an embodiment of the present disclosure.

Referring to FIG. 4, in conjunction with FIGS. 1-3, in step 401, computing device 101 displays a user interface of application 105 (e.g., gaming application), such as shown in FIG. 5. FIG. 5 illustrates an exemplary user interface 500 of application 105 (e.g., gaming application) prior to modifying the user interface elements. Such a user interface is what appears to the user of computing device 101 prior to recording the user interface to be broadcasted to viewers 104 via video live streaming service 102.

Returning to FIG. 4, in conjunction with FIGS. 1-3 and 5, in step 402, computing device 101 detects an initiation of recording the user interface (e.g., user interface 500) of application 105 (e.g., gaming application). For example, in one embodiment, computing device 101 detects the reception of input from content creator 101 to begin recording the user interface (e.g., user interface 500) of application 105, such as via keyboard 212 or mouse 213. In another embodiment, computing device 101 detects the initial execution of screen recorder 106 to begin recording the user interface (e.g., user interface 500) of application 105. For example, content creator 101 may decide to start broadcasting online in real time his/her gaming session through video live streaming service 102. As a result, screen recorder 106 may be executed by content creator 101, such as via keyboard 212 or mouse 213.

As discussed above, screen recorder 106 may not record all the information desired to be seen and heard by viewers 104 since the user interface of application 105 may not currently display and produce such information. As a result, the principles of the present disclosure modifies the user interface in such a manner as to ensure that the information desired to be viewed and heard by viewers 104 is most clearly seen and audible during the recorded session.

In step 403, computing device 101 issues a request to user interface modifier 107 to provide modifications to the user interface of application 105 in response to detecting the initiation of recording the user interface (e.g., user interface 500) of application 105 so as to ensure that the information desired to be viewed and heard by viewers 104 is most clearly seen and audible during the recorded session. In connection with the request, computing device 101 provide user interface modifier 107 the user interface elements, such as the document object model (DOM) elements of the user interface. In one embodiment, computing device 101 further provides user interface modifier 107 user interface metadata that describes the contents and layouts of the user interface elements, including the size of the user interface elements, the location of the user interface elements (e.g., x-y coordinate on the display screen), duration of time that a user interface element is to be displayed, a loudness of an audio element, behavior of the moving items in the user interface, etc. Such information may be utilized by user interface modifier 107 to determine what modifications need to be made.

As previously discussed, such modifications may include displaying new content, adjusting a size of an element of the user interface, adjusting a location of an element of the user interface, adjusting a duration of time in displaying an element of the user interface, adjusting an audio element of the user interface, adding overlay information to the user interface, adding or removing an audio component, adding, removing or altering transitions (moving elements of the user interface), etc. It is noted that these are exemplary modifications and that the principles of the present disclosure are not to be limited in scope to such examples. Instead, the principles of the present disclosure are to include any modification to the user interface of application 105 that ensures that the information desired to be viewed and heard by viewers 104 is most clearly seen and audible during the recorded session. A person of ordinary skill in the art would be capable of applying the principles of the present disclosure to such implementations. Further, embodiments applying the principles of the present disclosure to such implementations would fall within the scope of the present disclosure.

In one embodiment, UI modifier 107 uses machine learning to examine the stylistic, visual and audible preferences of viewers 104 viewing a recorded broadcast, such as a recorded gaming session by content creator 101 via video live streaming service 102, by asking them questions via a survey or by requesting feedback. For example, the survey may ask "How difficult is reading characters on the screen? What is your opinion about organization of information on the screen? Is it important to see textual content for the avatars? Is it important to see the stream chat? What are your preferences as to the location of the stream chat? What is your preference as to the size of the font size of the textual content? Is it important to view the information pertaining to the gaming opponent? Is the recorded audio typically too quiet for you? Such an exemplary survey may be provided to viewers 104 by QuestionPro®. The collection of such survey information may be collected and used by an expert to provide an accurate training data to the machine learning algorithm (e.g., supervised learning) to build an accurate mathematical model to appropriately modify the user interface elements of the application (e.g., gaming application).

In one embodiment, UI modifier 107 using a machine learning algorithm (e.g., supervised learning) to build a mathematical model based on sample data consisting of user interface characteristics that are preferred by viewers 104 of a recorded video session, such as displaying text pertaining to the avatar in a certain font at a certain distance from the avatar or displaying information pertaining to the gaming opponent along the side of the screen. Such user interface characteristics may be obtained and tabulated by experts, who in turn, utilize such information to develop the sample data. Such a data set is referred to herein as the "training data" which is used by the machine learning algorithm to make predictions or decisions without being explicitly programmed to perform the task. Such a training set is provided by an expert in modifying the user interface of the application being recorded in such a manner as to ensure that the information desired to be viewed and heard by viewers 104 is most clearly seen and audible during the recorded session. Examples of such supervised learning algorithms include nearest neighbor, Naive Bayes, decision trees, linear regression, support vector machines and neural networks.

In one embodiment, the machine learning model corresponds to a classification model trained to predict the modifications to the user interface of the application being recorded in such a manner as to ensure that the information desired to be viewed and heard by viewers 104 is most clearly seen and audible during the recorded session based on the training set.

In one embodiment, UI modifier 107 utilizes profiles of viewers 104 to determine what modifications to the user interface of application 105 need to be made during the recording of application 105 as it is broadcasted to viewers 104 via video live streaming service 102. Such profiles may include user preferences concerning size and location of various user interface elements, such as avatars and textual content, transitions (behavior of moving items in the user interface), duration of time visual elements should be displayed, overlay information, content to be displayed, audio volume, etc. Such user preferences extracted from these profiles may be used to adapt the user interface of application 105 as it is broadcasted to viewers 104 via video live streaming service 102. In one embodiment, such preferences may be tabulated to form a summary of preferences across a group of viewers 104 so that the user interface of application 105 is modified accordingly during its recording to ensure that the information desired to be viewed and heard by the majority of viewers 104 is most clearly seen and audible during the recorded session.

In one embodiment, UI modifier 107 observes user interactions (interactions by viewers 104) with the broadcasted recorded sessions to provide implicit feedback as to what viewers 104 like and not like about the broadcasted recorded sessions. In one embodiment, such observations may be made by utilizing heatmapping or session recording tools (e.g., Hotjar®, Mouseflow®, Inspectlet, etc.). Such interactions may be used to infer user preferences concerning size and location of various user interface elements, such as avatars and textual content, transitions (behavior of moving items in the user interface), duration of time visual elements should be displayed, overlay information, content to be displayed, audio volume, etc. Machine learning techniques may utilize such information to recognize patterns from user behavior and make recommendations as far as which modifications to the user interface of application 105 during recording should be made.

In one embodiment, UI modifier 107 utilizes a pre-existing set of user interface adaptation rules that are upgraded according to the viewer's experience with the broadcasted recorded session. In one embodiment, such user experience is utilized by a rule learning engine 108 of UI modifier 107.

In one embodiment, viewers 104 provide feedback to UI modifier 107 regarding the broadcasted recorded session using emoticons or recommendation frames. With respect to emoticons based feedback, such emoticons are aimed at expressing the satisfaction degrees among viewers 104 picking the emoticon judging his/her experience. With respect to recommendation frames, a simple interaction, such as a pop-up window or sliding area, may be used to provide recommendations. Such feedback may include user preferences concerning size and location of various user interface elements, such as avatars and textual content, transitions (behavior of the moving items in the user interface), duration of time visual elements should be displayed, overlay information, content to be displayed, audio volume, etc.

Rule learning engine 108 is responsible for analyzing collected user judgments. Gathered data are intended to serve in a promoting/demoting ranking, which assigns a priority to the executed rule in order to promote or demote rules and try to resolve conflicting ones. In one embodiment, rule learning engine 108 is based on a supervised learning approach requiring a trainer-rule engine 109 of UI modifier 107.

In one embodiment, trainer-rule engine 109 is responsible for ensuring the training phrase by executing pre-existed adaptation rules, which serve by way of a training set to detect a pattern of user behavior throughout viewers' 104 interactions and feedback. Furthermore, trainer-rule engine 109 generates the statistics and (promote/demote) ranking for rule learning engine 108.

In one embodiment, a machine learning algorithm 110 (e.g., learning classifier algorithm) of UI modifier 107 utilizes such rules as a training set for recommending the modifications to the user interface of application 105 during recording, where such rules are updated based on additional feedback provided by viewers 104 discussed above.

As previously discussed, UI modifier 107 receives the user interface elements, such as the document object model (DOM) elements of the user interface, from computing device 101 that are currently being displayed on computing device 101. Furthermore, as discussed above, UI modifier 107 receives the user interface metadata from computing device 101 that describes the contents and layouts of the user interface elements, including the size of the user interface elements, the location of the user interface elements (e.g., x-y coordinate on the display screen), duration of time that a user interface element is to be displayed, a loudness of an audio element, behavior of the moving items in the user interface, etc. Such information may be utilized by user interface modifier 107 to determine what modifications need to be made.

For example, if UI modifier 107 determines that viewers 104 generally prefer to see the textual content pertaining to the avatar next to the avatar, then UI modifier 107 will issue an instruction to application 105 to modify the user interface of application 105 to have the textual content pertaining to the avatar next to the avatar, such as specifying both the textual content and the location (e.g., x-y coordinate on display screen 215) of the textual content on the user interface, as opposed to having the textual content pertaining to the avatar not being displayed or being displayed underneath an icon as currently displayed on the user interface of application 105.

In another example, the stream chat may currently be displayed in the user interface of application 105 in a small font size along the border of the screen thereby making it unreadable for viewers 104. Such information may be determined from the obtained user interface metadata. If UI modifier 107 determines that viewers 104 generally prefer visually seeing the stream chat along the border of the screen with a particular font size that exceeds the currently used font size, then UI modifier 107 will issue an instruction to application 105 to modify the user interface of application 105 to increase the font size of the stream chat.

In a further example, the user interface depicting information pertaining to the gaming opponent may not currently be displayed in the user interface of application 105. Such information may be determined from the obtained user interface metadata. If UI modifier 107 determines that viewers 104 generally prefer to visually see information pertaining to the gaming opponent, then UI modifier 107 will issue an instruction to application 105 to modify the user interface of application 105 to display such information (e.g., "There are 26 cards in your opponent's deck"), such as specifying the content and location of such content (e.g., x-y coordinate on display screen 215) to be displayed on the user interface of application 105.

In another example, UI modifier 107 may determine that the user interface of application 105 includes an animated element (e.g., avatar) that crosses the user interface vertically based on the received user interface metatdata. If UI modifier 107 determines that viewers 107 generally prefer viewing the animated element cross the user interface horizontally, then UI modifier 107 will issue an instruction to application 105 to modify the user interface of application 105 to display the animated element to cross the screen horizontally, such as specifying the locations of such movement (e.g., x-y coordinates on display screen 215) to be displayed on the user interface of application 105.

In a further example, UI modifier 107 may determine that the user interface of application 105 includes an audio component set to a low sound level. If UI modifier 107 determines that viewers 107 generally prefer having the audio component set to a medium sound level, then UI modifier 107 will issue an instruction to application 105 to modify the audio component to increase its sound level to the medium sound level.

In step 404, computing device 101 receives such modifications from user interface modifier 107.

In step 405, computing device 101 then modifies the user interface of application 105 in response to detecting the initiation of recording the user interface of application 105 after receipt of the modifications to the user interface of application 105. By modifying the user interface of application 105 with such modifications, the information desired to be viewed and heard by viewers 104 is recorded. Exemplary modifications are shown in FIGS. 6 and 7.

FIG. 6 illustrates an example of the user interface 600 of application 105 (e.g., gaming application) after modifying its user interface elements in accordance with an embodiment of the present disclosure.

Referring to FIG. 6, in conjunction with FIG. 5, user interface 600 now includes an easier to read stream chat 601 with a larger font size in comparison to stream chat 501 of user interface 500. Additionally, user interface 600 now includes user interface element 602 that includes information pertaining to the opponent (e.g., "There are 26 cards in your opponent's deck"). Such information may correspond to newly displayed content or such information may have been previously hidden, such as under an icon.

FIG. 7 illustrates a further example of the user interface 700 of application 105 (e.g., gaming application) after modifying its user interface elements in accordance with an embodiment of the present disclosure.

Referring to FIG. 7, in conjunction with FIGS. 6 and 7, user interface 700 now includes user interface element 701 that depicts information pertaining to the opponent (e.g., "There are 26 cards in your opponent's deck") at the center of user interface 700 as opposed to the side of user interface 600 (see element 602). Such an adjustment in the location of the user interface element may be based on the desire of most viewers 104 to view such information at the center of the user interface.

Furthermore, FIG. 7 illustrates the depiction of user interface element 702 containing textual context pertaining to the avatar (Warpath). Such information was not presented in user interface 500 which UI modifier 107 determined to be important to be viewed by the viewers 104.

Returning to FIG. 4, in conjunction with FIGS. 1-3 and 5-7, in step 406, computing device 101 records the modified user interface (e.g., user interface 600, user interface 700) of application 105, such as by screen recorder 106. In one embodiment, after detecting the initiation of screen recorder 106, the recording will be suspended by computing device 101 until receipt of the modification of the user interface elements of the user interface of application 105 from UI modifier 107. After modifying the user interface of application 105 as previously discussed, screen recorder 106 will resume (i.e., will be unsuspended) the recording of the user interface of application 105.

In step 407, computing device 101 broadcasts the recorded modified user interface of application 105 to viewers 104 over network 103 via video live streaming service 102. In one embodiment, such recording and broadcasting occurs simultaneously. By broadcasting the modified user interface of application 105, viewers 104 will now be able to view the information desired to be viewed and heard by viewers 104.

In step 408, a determination is made by computing device 101 as to whether the broadcast has been completed. If not, computing device 101 continues to determine whether the broadcast has been completed.

If, however, the broadcast has been completed, then, in step 409, computing device 101 displays the user interface of application 105 without modifications, such as user interface 500 of FIG. 5, which illustrates the user interface elements depicted prior to the recording of the user interface of application 105.

As a result of the foregoing, embodiments of the present disclosure provide a means for improving the technology or technical field of screen recorders by modifying the user interface presented to the content creator in a manner that allows the information desired to be viewed and heard by the viewers to be clearly shown (and audible) on the user interface of the content creator so that it will be seen and heard by the viewers as it is recorded by a screen recorder and broadcasted to the viewers via a video live streaming service.

Furthermore, the present disclosure improves the technology or technical field involving screen recorders. As discussed above, video live streaming services, such as Twitch®, provide online streaming media that is simultaneously recorded and broadcasted in real time. For example, such video live streaming services may provide video game live streaming, including broadcasts of esports (electronic sports) competitions. Other types of content that may be simultaneously recorded and broadcasted include music broadcasts, creative content and "in real life" streams. An individual, referred to as an "online streamer," broadcasts themselves online, including in real time, through such video live streaming services. For example, an individual may broadcast his/her gaming sessions through such video live streaming services. Typically, the online streamer uses a screen recorder, such as a gaming recorder, to digitally record the computer screen output, such as the user's gaming session. Examples of gaming recorders include Filmora® Scrn, OBS Studio, VLC®, xSplit, Nvidia® ShadowPlay®, Fraps, etc. Such gaming recorders may allow the user to capture system audio, video, microphone and webcam at the same time. Furthermore, such gaming recorders allow the user to add markers at different points, change video speed as well as add fade in/fade out. Such gaming recorders may allow the user to customize the recording settings, such as targeting the entire screen, a specific region or the target window. However, such recorders may not record all the information desired to be seen and heard by the viewers. For example, viewers may desire to see more textual content pertaining to the avatar than what is being recorded by the recorder due to the fact that the user interface of the application (e.g., gaming application) displays the textual content pertaining to the avatar underneath an icon. In another example, viewers may desire to see the stream chat which is currently displayed in the user interface of the application (e.g., gaming application) in a small font size along the border of the screen thereby making it unreadable for the viewers. In a further example, the user interface element of the application (e.g., gaming application) may depict information pertaining to the gaming opponent (e.g., "There are 26 cards in your opponent's deck") along the side of the screen. The viewers, however, may desire to have this user interface element depicted in the center of the screen. In another example, the audio volume established by the user recording the application (e.g., gaming application) is more quiet than desired by the viewers, and hence the viewers may miss some important advances by the avatar in the game which are indicated via sounds. As a result, information desired to be viewed and heard by the viewers of video live streaming services may be lost during the recording session. Unfortunately, there is not currently a means for enabling screen recorders, such as gaming recorders, to record such missing information during the recording session.

Embodiments of the present disclosure improve such technology by displaying a user interface for an application (e.g., gaming application). Upon detecting an initiation of recording the user interface of the application, the user interface of the application is modified to ensure that the information desired to be viewed and heard by the viewers is recorded, such as by displaying new content, adjusting a size of an element of the user interface, adjusting a location of an element of the user interface, adjusting a duration of time in displaying an element of the user interface, adjusting an audio element of the user interface, adding overlay information to the user interface, adding or removing an audio component, adding, removing or altering transitions (moving elements of the user interface), etc. After such modifications, the modified user interface of the application is recorded and broadcasted to viewers via a video live streaming service. In this manner, the viewers are able to see and hear information desired to be viewed and heard that may have been previously lost during the recording of the user interface prior to such modifications. Furthermore, in this manner, there is an improvement in the technical field involving screen recorders.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for recording information in a user interface of an application more desired to be seen and heard by viewers, the method comprising:
   displaying said user interface of said application;
   detecting an initiation of recording said user interface of said application; and
   modifying said user interface of said application based on user interface metadata or user interface adaptation rules in response to detecting said initiation of recording said user interface of said application, wherein said modification of said user interface of said application comprises one or more of the following: displaying new content, adjusting a size of an element of said user interface, adjusting a location of an element of said user interface, adjusting a duration of time of displaying an element of said user interface and adjusting an audio element of said user interface.

2. The method as recited in claim 1 further comprising:
   recording said modified user interface of said application.

3. The method as recited in claim 2 further comprising:
   broadcasting said recorded modified user interface of said application to said viewers over a network.

4. The method as recited in claim 3, wherein said recording and said broadcasting occurs simultaneously.

5. The method as recited in claim 3 further comprising:
   displaying said user interface of said application without said modification in response to completion of said broadcast of said recorded modified user interface of said application to said viewers over said network.

6. The method as recited in claim 1 further comprising:
   modifying said user interface of said application based on user feedback; and
   observing user interactions with broadcasted recorded sessions to provide implicit feedback as to what viewers like and not like about said broadcasted recorded sessions, wherein said observations are made by utilizing heatmapping or session recording tools.

7. The method as recited in claim 1, wherein said modification of said user interface of said application comprises adding overlay information to said user interface.

8. The method as cited in claim 1, wherein said modification of said user interface of said application comprises adding or removing an audio component.

9. The method as recited in claim 1, wherein said application comprises a gaming application.

10. A computer program product for recording information in a user interface of an application more desired to be seen and heard by viewers, the computer program product comprising one or more computer readable storage mediums having program code embodied therewith, the program code comprising programming instructions for:
displaying said user interface of said application;
detecting an initiation of recording said user interface of said application; and
modifying said user interface of said application based on user interface metadata or user interface adaptation rules in response to detecting said initiation of recording said user interface of said application, wherein said modification of said user interface of said application comprises one or more of the following: displaying new content, adjusting a size of an element of said user interface, adjusting a location of an element of said user interface, adjusting a duration of time of displaying an element of said user interface and adjusting an audio element of said user interface.

11. The computer program product as recited in claim 10, wherein the program code further comprises the programming instructions for:
recording said modified user interface of said application.

12. The computer program product as recited in claim 11, wherein the program code further comprises the programming instructions for:
broadcasting said recorded modified user interface of said application to said viewers over a network.

13. The computer program product as recited in claim 12, wherein said recording and said broadcasting occurs simultaneously.

14. The computer program product as recited in claim 12, wherein the program code further comprises the programming instructions for:
displaying said user interface of said application without said modification in response to completion of said broadcast of said recorded modified user interface of said application to said viewers over said network.

15. The computer program product as recited in claim 10, wherein the program code further comprises the programming instructions for:
modifying said user interface of said application based on user feedback; and
observing user interactions with broadcasted recorded sessions to provide implicit feedback as to what viewers like and not like about said broadcasted recorded sessions, wherein said observations are made by utilizing heatmapping or session recording tools.

16. The computer program product as recited in claim 10, wherein said modification of said user interface of said application comprises adding overlay information to said user interface.

17. The computer program product as cited in claim 10, wherein said modification of said user interface of said application comprises adding or removing an audio component.

18. The computer program product as recited in claim 10, wherein said application comprises a gaming application.

19. A system, comprising:
a memory for storing a computer program for recording information in a user interface of an application more desired to be seen and heard by viewers; and
a processor connected to said memory, wherein said processor is configured to execute program instructions of the computer program comprising:
displaying said user interface of said application;
detecting an initiation of recording said user interface of said application; and
modifying said user interface of said application based on user interface metadata or user interface adaptation rules in response to detecting said initiation of recording said user interface of said application, wherein said modification of said user interface of said application comprises one or more of the following: displaying new content, adjusting a size of an element of said user interface, adjusting a location of an element of said user interface, adjusting a duration of time of displaying an element of said user interface and adjusting an audio element of said user interface.

20. The system as recited in claim 19, wherein the program instructions of the computer program further comprise:
recording said modified user interface of said application.

21. The system as recited in claim 20, wherein the program instructions of the computer program further comprise:
broadcasting said recorded modified user interface of said application to said viewers over a network.

22. The system as recited in claim 21, wherein said recording and said broadcasting occurs simultaneously.

23. The system as recited in claim 21, wherein the program instructions of the computer program further comprise:
displaying said user interface of said application without said modification in response to completion of said broadcast of said recorded modified user interface of said application to said viewers over said network.

24. The system as recited in claim 19, wherein the program instructions of the computer program further comprise:
modifying said user interface of said application based on user feedback; and
observing user interactions with broadcasted recorded sessions to provide implicit feedback as to what viewers like and not like about said broadcasted recorded sessions, wherein said observations are made by utilizing heatmapping or session recording tools.

25. The system as recited in claim 19, wherein said modification of said user interface of said application comprises adding overlay information to said user interface.

* * * * *